United States Patent [19]

Welsby

[11] 4,148,342
[45] Apr. 10, 1979

[54] HOSE STRUCTURE AND METHOD FOR MAKING

[75] Inventor: Joseph A. Welsby, Lisburn, Northern Ireland

[73] Assignee: The Goodyear Tire & Rubber Company, Akron, Ohio

[21] Appl. No.: 858,240

[22] Filed: Dec. 7, 1977

Related U.S. Application Data

[63] Continuation of Ser. No. 690,350, May 27, 1976, abandoned.

[51] Int. Cl.² ............................................. F16L 11/08
[52] U.S. Cl. .................................... 138/109; 285/177; 285/239; 138/137; 138/144; 138/177
[58] Field of Search ............... 138/103, 137, 138, 177, 138/178, DIG. 11, 120, 144, 155, 109; 285/177, 235, 236, 239

[56] References Cited

U.S. PATENT DOCUMENTS

| | | | |
|---|---|---|---|
| 2,072,893 | 3/1937 | Lee | 285/177 |
| 2,955,847 | 10/1960 | McKenna | 138/177 X |
| 3,119,415 | 1/1964 | Galloway et al. | 138/103 |
| 3,613,736 | 10/1971 | Kuwabara | 138/138 X |
| 3,811,477 | 5/1974 | Thawley | 138/137 X |
| 3,902,531 | 9/1975 | Thawley | 138/177 X |
| 3,933,544 | 1/1976 | Torghele | 138/138 X |

FOREIGN PATENT DOCUMENTS 116844 4/1943 Australia .................................. 138/137

Primary Examiner—Charles E. Phillips
Attorney, Agent, or Firm—L. A. Germain

[57] ABSTRACT

A hose structure which is useful as a transitional piece for a connection between two elements of different diameters. The hose has a tapered bore with an oppositely tapered sleeve of deformable material outwardly of the sleeve interior to form a substantially cylindrical outer surface over which the remaining portions of the hose structure are applied. If desired, buoyancy material can be included in the hose structure so that the hose will be buoyant and float in water. The method includes applying an elastomeric liner around a tapered mandrel, applying the tapered layer of deformable material to form a cylindrical outer surface, applying at least one reinforcing layer to the cylindrical surface, applying a cover over the reinforcing layer then vulcanizing the structure to form an integral unit.

5 Claims, 2 Drawing Figures

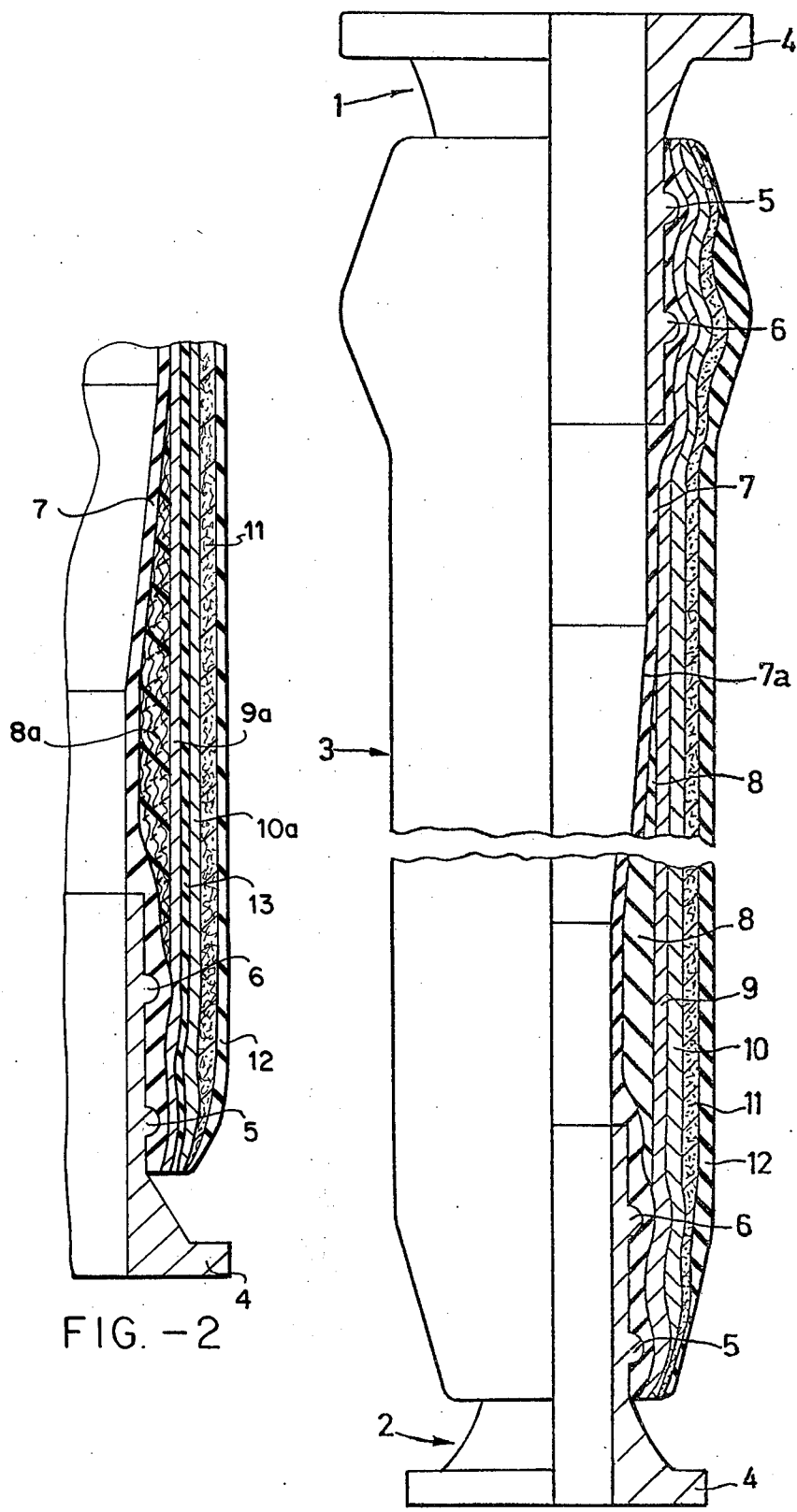

HOSE STRUCTURE AND METHOD FOR MAKING

This is a continuation of application Ser. No. 690,350 filed May 27, 1976 now abandoned.

This invention relates to a hose structure and to a complete hose unit utilizing such structure.

Large bore hoses (e.g. 10, 12, 16, 20, 24 or 30 inch bore) are used to convey large quantities of oil and especially to load oil tankers from a single buoy mooring system.

Such systems provide a floating surface terminal, or buoy, moved in deep water to accommodate a larger tanker and connected on the one hand to fixed pipelines on the sea bed (e.g. running back to a shore terminal) and on the other to a floating line of hoses leading to the tanker cargo holds. Since the sea-bed pipe lines, the buoy manifold and the tanker manifold are often of different sizes, transitional pieces are used to make the connections, especially between the buoy and the tanker.

Such transitional pieces have hitherto been short rigid tapered rapid internal taper, necessary to accommodate changes of bore of 4 or 6 inches, leads to turbulence.

We have now discovered that certain constructions of longer, flexible, internally tapered units can be used to overcome or reduce this disadvantage.

The present invention consists in a unitary vulcanized hose structure with a tapered bore comprising in successive layers (a) an innermost elastomeric lining (b) a single or composite layer of deformable material of increasing thickness in the direction of decreasing bore such that it presents an essentially cylindrical outer surface (c) at least one reinforcement layer wound around the cylindrical surface and (d) at least one cover layer of elastomeric material.

The layer of deformable material can be a layer of elastomer (e.g. oil-resistant synthetic rubber), a layer of successive layers of textile material (such as a cotton, rayon, nylon or polyester fabric) or a combination thereof.

Reinforcement layers can comprise one or more plies of textile or wire reinforcement, helically wound (e.g. as multiple helices) and usually in combination with a heavy helical steel body wire or wires. Part or all of such structure may alternatively be replaced by a sandwich reinforcement wherein a layer of elastomer is bonded on each surface to a layer of yarn or fabric of a high compression modulus.

Such a hose structure can usually be embodied as a hose unit with coaxially bored steel attachment members one at each end vulcanized or otherwise attached to the hose structure.

While any type of elastomer can be used in the above structures, oil-resistant synthetic rubbers are obviously preferable.

The invention also envisages a method of making such a structure wherein (a) an elastomeric lining is applied around a tapered mandrel (b) a single or composite layer of deformable material is applied around the lining, in increasing thickness in the direction of decreasing mandrel diameter, to present an essential cylindrical outer surface (c) at least one reinforcement layer is wound round the cylindrical surface (d) at least one cover layer is applied around the reinforcement layer and (e) the structure is vulcanized to unite the various layers.

Coaxially bored steel attachment members may be attached one at each end prior to or after vulcanization.

The invention will be further described with reference to the accompanying drawing in which:

FIG. 1 is a longitudinal partial section of the two end portions of the tapered-bore hose comprising the invention; and FIG. 2 is a longitudinal partial section of the tapered bore portion showing an alternative structure.

The hose unit consists of steel end fittings 1 of larger bore and steel end fitting 2 of smaller bore connected by, and vulcanized into attachment with, a hose structure generally indicated at 3.

Each end fitting possesses a flange 4 and circumferential ribs 5 and 6 to improve its grip on hose structure 3.

The hose structure 3 in the illustrative embodiment shown has and innermost elastomeric lining 7, a single or composite layer of deformable material 8, layers of main reinforcing members 9 and 10, one or more plies of a textile breaker fabric 11 and an elastomeric cover layer 12.

The inner elastomeric lining 7 is of essentially uniform thickness, is vulcanized to the end fittings, and possesses a smooth tapered internal surface at 7a. This smooth tapered internal bore can be formed over a suitable tapered mandrel, i.e. either formed completely in steel or formed as a cylindrical steel mandrel with a suitably tapered overbuild of a vulcanized elastomeric material.

The single or composite layer of deformable material 8 increases in thickness from the wider-bore and to the narrower-bore end of the structure, so as to define an essentially cylindrical external shape over the length of the structure between the end fittings 1 and 2. In the embodiment shown layer 8 does not extend over the end fittings. It can comprise a progressively increasing number of layers of a textile breaker fabric 8a as shown in FIG. 2, or it can comprise a layer of elastomer of increasing thickness as shown in FIG. 1, or it can comprise a combination of both of these expedients, for instance as an elastomeric layer of increasing thickness with a uniform layer (or layers) of textile breaker on top.

Although the exact nature of layer 8 can vary, the increase in amount of material surrounding the narrower bore of the tube provides increased axial stiffness and thus an inherent resistance to "whip" action due to turbulent flow in the narrower bore, while the deformable nature of this material helps cushion the structure itself against effects of this turbulent flow.

This main reinforcing members 9 and 10 can be variously constituted. This layer 9 can be one or more plies, e.g. spirally wound, of textile reinforcement. Alternatively, it can be suitable wound plies of wire cord. In either instance, layer 10 could be a heavy helical steel body wire or wires to provide a major reinforcement function. However, one or both of layers 9 and 10 could be replaced, jointly or individually, by one or more layers of sandwich construction reinforcement as shown in FIG. 2 and comprising (a) at least one layer 9a of yarn or fabric of a material of high modulus of compression (b) an elastomeric layer 13 bonded thereto and (c) at least one further layer 10a of yarn or fabric of a material of high modulus of compression bonded to the other surface of the elastomeric layer 13.

Although again the exact nature of the reinforcing layers 9 and 10 can vary, the plane of these layers is effectively constant from end to end of the structure (except where deformed into attachment to the end fittings) to provide a constant hoop stress resistance along the structure and to allow easy winding of the reinforcement with conventional equipment using fixed pitch and constant speed operation.

As already stated the hose structure is completed by another layer 11, comprising one or more plies of textile breaker fabric, and an elastomeric cover layer 12.

The man skilled in the art wil realize that all of the various wire and textile components which may be used are effectively embedded in and/or bonded to elastomeric hose material to give a unitary structure after vulcanization.

The hose made as described can be fabricated in longer lengths than the short rigid transition members currently in use. We have found lengths from 15 up to 40–50 feet, e.g. 30–35 feet, quite feasible to accommodate changes of bore by amounts up to 4 or even 6 inches from the conventional 10, 12, 16, 20, 24 or 30 inch bore hoses. Thus 16 inches down to 10 inches or 24 inches down to 20 have been accommodated.

Various modifications can be made to the configuration of the hose, such as the provision of integral buoyancy material for floatation purposes, along a lining, a deformable layer or layers of increasing thickness, a reinforcement layer or layers, and a cover layer or layers are generally present. Also, while vulcanized-on attachment of the hose to the end pieces is shown, other forms of attachment could be used.

For example such a hose may be rendered buoyant (in salt or fresh water) by one or two methods. In the first method flexible buoyancy material in the form of elastomeric or plastic closed cell sponge may be shaped around the hose exterior outside of the reinforcing material but inside the cover. This shaping can be done by using pre-shaped foam bodies or by applying the foam sheet as a circumferential or helical winding with such adhesive and reinforcing layers as may be necessary.

In the second method the hose can be rendered buoyant by placing cylinders of flexible or rigid elastomeric or plastic closed cell foam around the outside of the completed hose, that is to say outside of cover 12. Once again, such a covering can be built up as separate pre-shaped units or as circumferential or helical windings. It may itself be covered by a water impervious paint or other surface.

While certain representative embodiments and details have been shown for the purpose of illustrating the invention, it will be apparent to those skilled in this art that various changes and modifications may be made therein without departing from the spirit or scope of the invention.

I claim:

1. A unitary vulcanized transitional flexible large bore hose structure interconnected between two end fittings that match and couple to two elements having different bore diameters, which hose structure has a tapered bore extending between said end fittings from one end to the other with a resulting outer cylindrical surface of substantially uniform diameter, said hose structure comprising an elastomeric tubular layer of uniform crosssection forming the interior tapered bore of the hose interconnecting said end fittings, a layer of deformable material lying over said tubular with the thickness thereof increasing from one end to the other in the direction and for the length of decreasing bore to form a substantially cylindrical outer surface, at least one reinforcement layer surrounding said deformable layer, and an outer cover of elastomeric material forming the exterior of said hose structure.

2. A hose structure as claimed in claim 1 in which the layer of deformable material comprises multiple layers of textile material.

3. A hose structure as claimed in claim 1 wherein the reinforcement layer comprises at least one ply of textile material over at least one ply of helically wound wire reinforcement.

4. A hose structure as claimed in claim 1 wherein the reinforcing layer comprises a layer of elastomer sandwiched between and bonded to fabric of a high compression modulus.

5. A hose structure as claimed in claim 1 from 15 to 50 feet (4.5 to 15 meters) long and with internal bore decreasing by up to 6 inches (15 cm).

* * * * *

UNITED STATES PATENT AND TRADEMARK OFFICE
CERTIFICATE OF CORRECTION

PATENT NO. : 4,148,342
DATED : April 10, 1979
INVENTOR(S) : Joseph A Welsby

It is certified that error appears in the above-identified patent and that said Letters Patent are hereby corrected as shown below:

Column 1, line 23, after "tapered" insert -- members and have led to flow losses because the relatively --

Column 2, line 17, "and" should be -- an --.

Signed and Sealed this

Twenty-sixth Day of February 1980

[SEAL]

Attest:

SIDNEY A. DIAMOND

Attesting Officer    Commissioner of Patents and Trademarks